United States Patent
Jansen et al.

(10) Patent No.: US 11,365,456 B2
(45) Date of Patent: Jun. 21, 2022

(54) METHOD FOR PRODUCING HYDROPHOBICIZING LEATHER TREATMENT AGENTS

(71) Applicant: TFL Ledertechnik GmbH, Rheinfelden (DE)

(72) Inventors: Bernhard Jansen, Cologne (DE); Juergen Reiners, Leverkusen (DE); Rafael Grosch, Cologne (DE); Guenter Kaster, Leverkusen (DE); Uwe Borowski, Cologne (DE)

(73) Assignee: TFL Ledertechnik GmbH, Rheinfelden (DE)

( * ) Notice: Subject to any disclaimer, the term of this patent is extended or adjusted under 35 U.S.C. 154(b) by 0 days.

(21) Appl. No.: 16/467,609

(22) PCT Filed: Dec. 4, 2017

(86) PCT No.: PCT/EP2017/081289
§ 371 (c)(1),
(2) Date: Jun. 7, 2019

(87) PCT Pub. No.: WO2018/108595
PCT Pub. Date: Jun. 21, 2018

(65) Prior Publication Data
US 2020/0071779 A1   Mar. 5, 2020

(30) Foreign Application Priority Data
Dec. 13, 2016   (EP) .................................. 16203590

(51) Int. Cl.
| | |
|---|---|
| *C14C 9/00* | (2006.01) |
| *C08F 220/06* | (2006.01) |
| *C08F 220/68* | (2006.01) |
| *C08L 33/02* | (2006.01) |
| *C08L 33/10* | (2006.01) |
| *C14C 3/22* | (2006.01) |

(52) U.S. Cl.
CPC .............. *C14C 9/00* (2013.01); *C08F 220/06* (2013.01); *C08F 220/68* (2013.01); *C08L 33/02* (2013.01); *C08L 33/10* (2013.01); *C14C 3/22* (2013.01); *C08L 2201/54* (2013.01)

(58) Field of Classification Search
CPC . C14C 9/00; C14C 3/22; C08F 220/06; C08F 220/68; C08L 33/02; C08L 33/10; C08L 2201/54
See application file for complete search history.

(56) References Cited

U.S. PATENT DOCUMENTS

| | | | |
|---|---|---|---|
| 3,231,420 A | 1/1966 | Lowell et al. | |
| 5,316,860 A | 5/1994 | Stewart et al. | |
| 5,348,807 A * | 9/1994 | Hodder ..................... | C14C 9/00 428/473 |
| 6,379,751 B1 * | 4/2002 | Schafer .................. | C08G 18/12 427/389 |
| 7,637,961 B2 | 12/2009 | El A'mma et al. | |
| 8,778,457 B2 | 7/2014 | Huggins et al. | |
| 8,822,589 B2 | 9/2014 | Brym et al. | |
| 2003/0180469 A1* | 9/2003 | El A'mma ............... | C14C 9/00 427/389 |
| 2004/0232376 A1* | 11/2004 | Kleban ..................... | C14C 3/04 252/8.57 |
| 2007/0106043 A1 | 5/2007 | Horiuchi et al. | |
| 2010/0162490 A1 | 7/2010 | Brym et al. | |

FOREIGN PATENT DOCUMENTS

| | | |
|---|---|---|
| CN | 101796088 A | 8/2010 |
| EP | 0757108 A2 | 2/1997 |
| EP | 1087021 A1 | 3/2001 |
| GB | 1026648 A | 4/1966 |

OTHER PUBLICATIONS

International Search Report from International Application No. PCT/EP2017/081289, dated Mar. 14, 2018, three pages.

* cited by examiner

*Primary Examiner* — Amina S Khan
(74) *Attorney, Agent, or Firm* — Volpe Koenig

(57) ABSTRACT

A method of preparing hydrophobicizing leather treatment compositions includes the steps of
  a) free-radically initiated copolymerization of
    i) at least one ethylenically unsaturated carboxylic acid or its derivatives, and
    ii) at least one (meth)acrylate of a primary saturated $C_8$ to $C_{22}$ alcohol,
  b) mixing the reaction mixture obtained after step a) with water,
  c) salting at least some of the carboxyl groups of the reaction mixture obtained after step b) with a base, and
  d) shearing the reaction mixture obtained after step c) to an average particle size of 0.05-10 µm,
wherein step a) is carried out in oil as reaction medium and wherein the atmosphere in step a) contains less than 0.1% by volume of an oxidizing gas.

13 Claims, No Drawings

US 11,365,456 B2

METHOD FOR PRODUCING HYDROPHOBICIZING LEATHER TREATMENT AGENTS

The present invention relates to a method of preparing hydrophobicizing leather treatment compositions, the hydrophobicizing leather treatment composition yielded by said method, aqueous dispersions and also their use in methods of tanning leather and also the leathers obtained thereby.

Hydrophobicizing leather treatment compositions contain copolymers consisting of hydrophobic and hydrophilic monomer components. The hydrophilic part engenders an emulsifiability in water, the hydrophobic part engenders the fatliquoring and hydrophobicizing effect of the copolymers. Hydrophobicizing leather treatment compositions are used in retanning for their fatliquoring, filling and hydrophobicizing properties.

The prior art regarding processes for preparing hydrophobicizing leather treatment compositions firstly envisages therein the use of organic solvents, while emulsifiers are frequently used additionally or alternatively in the processes when the process is carried out as an emulsion polymerization.

U.S. Pat. No. 5,316,860A describes amphiphilic copolymers for leather treatment which are formed by free-radical polymerization of acrylic acid and methacrylates of long-chain fatty alcohols in water-miscible solvents such as tert-butanol or ethylene glycol monobutyl ether. Unless distilled off, the solvents used remain in the end product, which is then used for hydrophobicization of tanned leather.

EP 0 757 108A2 describes a method of hydrophobicizing leather using aqueous dispersions of amphiphilic copolymers and silicone oils. The amphiphilic copolymer depicted is very largely identical to the copolymer of U.S. Pat. No. 5,316,860A; the solvents disclosed therein are used.

EP 1 087 021A1 discloses leather treatment compositions for hydrophobicization, retanning and fatliquoring of leather that consist of a carboxyl- or anhydride-functional polysiloxane, an amphiphilic copolymer, an emulsifier and an oil or wax. The leathers obtained display, in some cases, diffusion-based inhomogeneities in fatliquor distribution and hence an unlevel colouration. In addition, some of the leathers obtained are prone to loose grain and/or double skin.

EP 1 342 797A1 discloses aqueous dispersions used as leather treatment compositions in the fatliquoring step. The amphiphilic polymers used therein are used together with a stabilizing emulsifier and are obtained in a high-pressure polymerization process wherein solvents may also be used.

WO 2009/030697A1 likewise describes amphiphilic polymers for leather treatment. They comprise preparations which are used in pretanning, main tanning and retanning and have a tanning, retanning, hydrophobicizing, fatliquoring and dispersing effect. They are obtained by emulsion polymerization with use of emulsifiers.

The processes of the prior art and also the hydrophobicizing leather treatment compositions yielded thereby have disadvantages.

The organic solvents used in many processes are environmentally harmful and represent an avoidable form of wastewater pollution. Volatile organic compounds (VOCs) moreover are subject to strict regulations designed to protect man and the environment. Some organic solvents moreover are flammable and/or harmful to health and represent avoidable risks in the handling of products containing same, apart from the need to label such a mixture as hazardous material. Unless the organic solvents are removed once the hydrophobicizing leather treatment composition has been obtained, they remain in the latter and may have adverse ramifications for the leather in the retanning step.

The distillative removal of organic solvents is inconvenient and requires additional, time-consuming processing steps and also costs, including for the energy required therefor.

The emulsifiers required for an emulsion polymerization typically disrupt the use of the leather treatment composition as a hydrophobicizer with their hydrophilic moiety and may degrade the hydrophobic properties of the final leather.

Furthermore, many hydrophobicizing leather treatment compositions of the prior art lead to leathers having a spotty appearance, an unpleasant hand or a loose grain, i.e., properties that are undesirable and/or unacceptable.

The invention therefore addressed the problem of providing a method of preparing a hydrophobicizing leather treatment composition that avoids the abovementioned disadvantages and hence is friendlier to the environment and less burdensome.

The problem addressed by the invention was further that of providing a method of preparing a hydrophobicizing leather treatment composition that preferably yields a hydrophobicizing leather treatment composition which without further reactions is directly usable in the retanning of leather and more preferably leads to leathers having a high level of water resistance, most preferably a MAESER value of greater than 15 000 and a static water absorption of less than 35%, more preferably less than 30%, preferably measured to ASTM D-2099-70.

The hydrophobicizing leather treatment composition yielded by the method of the present invention should further preferably be advantageously usable in retanning with regard to tanning effect, hand and fullness. Nor should there preferably be adverse impacts on the dye- and dressability of the leather obtained or on the appearance of the leather.

It was found that, surprisingly, the above-described disadvantages of existing methods are overcome by a method of preparing hydrophobicizing leather treatment compositions which includes the steps of a) free-radically initiated copolymerization of
  i) at least one ethylenically unsaturated carboxylic acid or its derivatives, and
  ii) at least one (meth)acrylate of a primary saturated $C_8$ to $C_{22}$ alcohol, b) mixing the reaction mixture obtained after step a) with water, c) salting at least some of the carboxyl groups of the reaction mixture obtained after step b) with a base, and d) shearing the reaction mixture obtained after step c) to an average particle size of 0.05-10 μm, wherein step a) is carried out in oil as reaction medium and wherein the atmosphere in step a) contains less than 0.1% by volume of an oxidizing gas.

Step a)

Component i)

The at least one ethylenically unsaturated carboxylic acid or its derivatives of component i) is preferably selected from the group consisting of acrylic acid, methacrylic acid, itaconic acid, fumaric acid and maleic acid and also their derivatives, preferably anhydrides, more preferably maleic anhydride, and alkali metal salts, preferably sodium acrylate, and their mixtures.

The at least one ethylenically unsaturated carboxylic acid or its derivatives of component i) is more preferably selected from the group consisting of acrylic acid and methacrylic acid, most preferably acrylic acid.

The at least one ethylenically unsaturated carboxylic acid or its derivatives of component i) preferably differs from component ii), the activator, the chain transfer agent, the base, the oil, the miscellaneous added substances and the water.

Component ii)

The at least one (meth)acrylate of a primary saturated $C_8$ to $C_{22}$ alcohol of component ii) is preferably selected from the group consisting of esters of acrylic acid or methacrylic acid with fatty alcohols obtainable by the hydrogenation of fatty acids, by hydroformylation of alpha-olefins and subsequent hydrogenation to the alcohol or by the Alfol process.

The at least one (meth)acrylate of a primary saturated $C_8$ to $C_{22}$ alcohol of component ii) is more preferably selected from the group consisting of octyl acrylate, octyl methacrylate, 2-ethylhexyl acrylate, 2-ethylhexyl methacrylate, methacrylic ester of hydrogenated tallow fat alcohol, acrylic ester of hydrogenated tallow fat alcohol, stearyl methacrylate, stearyl acrylate, hexadecyl acrylate, hexadecyl methacrylate, dodecyl acrylate, dodecyl methacrylate, eicosanyl acrylate, eicosanyl methacrylate, docosanyl methacrylate and docosanyl acrylate and their mixtures, most preferably from the group consisting of hexadecyl acrylate, stearyl methacrylate and their mixtures.

The methacrylic and/or acrylic esters of the alcohols described above are frequently marketed as technical grade mixtures of the reaction products of alcohols differing in chain length. They can be used as such.

Component ii) is more preferably at least one (meth)acrylate of a primary saturated $C_{12}$-$C_{22}$ alcohol, most preferably of a primary straight-chain saturated $C_{12}$-$C_{22}$ alcohol.

The at least one (meth)acrylate of a primary saturated $C_8$- to $C_{22}$ alcohol of component ii) preferably differs from component i), the activator, the chain transfer agent, the base, the oil, the miscellaneous added substances and the water.

Activator:

The copolymerization is preferably initiated by at least one activator. The at least one activator for the free-radically initiated copolymerization taking place in step a) may be free-radical formers such as, for example, peroxides, peresters and azo compounds.

The at least one activator is preferably selected from the group consisting of tertiary butyl hydroperoxide, ditertiary butyl peroxide, dibenzoyl peroxide, succinic peroxide, cumene hydroperoxide, tertiary butyl perbenzoate, 2,2-azobis(2-methylbutyronitrile), 2,2-azobisisobutyronitrile and mixtures thereof, more preferably consisting of ditertiary butyl peroxide, 2,2-azobis(2-methylbutyronitrile) and mixtures thereof.

The activator preferably differs from components i) and ii), the chain transfer agent, the base, the oil, the miscellaneous added substances and the water.

Oil:

Step a) is carried out in oil as reaction medium.

The term "oil" is here to be understood as meaning an organic liquid which at 20° C. dissolves in water at less than 1 mol/L, preferably at less than 0.5 mol/L and most preferably at less than 0.1 mol/L.

The oil is preferably selected from the group consisting of synthetic oils, natural oils and mixtures thereof.

Synthetic oils are preferably selected from the group consisting of mineral oils and paraffin oils.

Useful paraffin oils include liquid, semiliquid or solid paraffin mixtures or mixtures therefrom. Paraffin oils are preferably derived from petroleum distillation steps. Paraffin oils may also have been derived by the Fischer-Tropsch process or by the gas-to-liquid (GTL) process.

White oil is a particularly preferable paraffin oil. It is particularly preferable to use white oil in step a). It is very particularly preferable to use White oil 285 in step a).

The term "white oil" is herein to be understood as meaning a petroleum distillate having a boiling point above 280° C. The white oil is preferably colourless and odourless.

White oil is generally also referred to as liquid paraffin. Light liquid types of white oil are also referred to as paraffinum perliquidum.

Natural oils are preferably selected from the group consisting of rapeseed oil, linseed oil, sunflower oil, thistle oil, olive oil, castor oil, train oil, cod liver oil, fish oil, bone oil, lecithin and mixtures thereof.

It is also possible to use hydrogenated or only partly hydrogenated forms of the recited natural oils in step a), preferably hydrogenated castor oil.

The oil used in step a) is preferably odour and taste free and by dint of hydrogenation processes does not contain any aromatics nor any sulfur compounds.

Further examples of the oil used in step a) include polyethylene waxes, including in oxidized form, polyisobutylene waxes, montan waxes, bees wax and carnauba wax.

The oils used in step a) are preferably aromatics free, colourless and low in odour.

The oil preferably differs from components i) and ii), the activator, the chain transfer agent, the base, the miscellaneous added substances and the water.

Chain Transfer Agent:

Step a) may also utilize at least one chain transfer agent in an effort to police the molecular weight.

The at least one chain transfer agent is preferably selected from the group consisting of alkyl mercaptans, thioglycolic esters, phenols, unsaturated compounds, preferably oleic acid, lower alcohols, preferably n-butanol and tert-butanol, and aldehydes.

The at least one chain transfer agent is preferably consumed in the course of the copolymerization and therefore does not appear in the end product.

The chain transfer agent is preferably different from components i) and ii), the activator, the oil, the base, the miscellaneous added substances and the water.

Copolymerization

The copolymerization is typically carried out at temperatures of 60° C. to 160° C., preferably at 85° C. to 150° C.

The atmosphere in step a) contains less than 0.1% by volume of an oxidizing gas, the oxidizing gas preferably being oxygen.

The atmosphere in step a) preferably contains less than 0.01% by volume of an oxidizing gas.

The atmosphere in step a) containing less than 0.1% by volume and preferably less than 0.01% by volume of an oxidizing gas is more preferably an inert gas atmosphere.

The inert gas atmosphere preferably consists to at least 90% by volume, preferably to at least 95% by volume, yet more preferably to at least 99% by volume and yet still more preferably to at least 99.5% by volume of one or more gases selected from the group consisting of noble gases, especially helium and argon, nitrogen and carbon dioxide, preferably selected from the group consisting of nitrogen and carbon dioxide, most preferably nitrogen.

A person having ordinary skill in the art has the knowledge and ability required to carry out the process.

The copolymerization may be carried out as follows:

The at least one ethylenically unsaturated carboxylic acid or its derivatives of component i) is polymerized with the at least one (meth)acrylate of a primary saturated $C_8$ to $C_{22}$ alcohol of component ii) in an oil as reaction medium in the presence of the activator and optionally of a chain transfer agent.

In one preferred embodiment, step a) comprises first initially charging some of the oil, preferably 70-90 wt % of the total amount of the oil used in step a), and subsequently adding the monomers i) and ii) and also the activator, dissolved in oil, preferably in 10-30 wt % of the total amount of the oil used in step a), and optionally a chain transfer agent and performing the polymerization.

In a further preferred embodiment, step a) comprises first initially charging some of the oil, preferably 15-25 wt % of the total amount of the oil used in step a), and subsequently adding the monomers i) and ii) and also the activator, dissolved in oil, preferably in 1-6 wt % of the total amount of the oil used in step a), and optionally a chain transfer agent and performing the polymerization. On completion of the polymerization the rest of the oil is admixed, preferably 69-84 wt % of the total amount of the oil used in step a).

It is further preferable first to admix a portion of the monomer mixture containing the monomers i) and ii) and also optionally a chain transfer agent in the form of a mixture and then to add the rest of the monomer mixture and also the activator, dissolved in oil. Regarding the preferred amounts as they relate to the oil, the amount particulars provided in the above preferred embodiments apply.

Step b)

The reaction mixture obtained after step a) is if necessary allowed to cool down, preferably to 80-110° C., more preferably to 85-105° C., and admixed with water. It is preferably demineralized water which is used in step b).

The temperature of the water added in step b) is preferably 70-95° C., more preferably 80-90° C.

Step c)

Bases commonplace to a person skilled in the art come into consideration for salting at least some of the carboxyl groups in the reaction mixture obtained after step b).

The step of salting at least some of the carboxyl groups of the reaction mixture obtained after step b) is preferably effected with an aqueous solution of at least one of the bases selected from the group consisting of sodium hydroxide, potassium hydroxide, lithium hydroxide, sodium carbonate, ammonia, ethanolamine, diethanolamine, triethanolamine, N-methylethanolamine, N,N-dimethylethanolamine, triethylamine and octylamine and also mixtures thereof.

The step of salting at least some of the carboxyl groups of the reaction mixture obtained after step b) is more preferably effected with an aqueous solution of at least one of the bases selected from the group consisting of sodium hydroxide and ethanolamine.

The aqueous base solution used in step c) is preferably 30-70% in strength, more preferably 40-60% in strength, based on the base.

It is preferable to use from 0.5 to 1.0 equivalent of base per 1.0 equivalent of carboxyl groups on the polymer. The amount-of-substance amount of the carboxyl groups on the polymer corresponds to the amount-of-substance amount of the carboxyl groups of the at least one ethylenically unsaturated carboxylic acid or its derivatives of component i) used in step a).

It is preferred in step c) to salt 50-100% of the carboxyl groups of the reaction mixture obtained after step b).

To carry out the salting in step c), either the reaction mixture obtained after step b) can be initially charged and the aqueous solution of the base admixed, or the aqueous solution of the base is initially charged and the reaction mixture obtained after step b) is admixed.

The reaction mixture after combining the reaction mixture obtained after step b) with the base is preferably stirred still further, more preferably at 75-95° C. and most preferably at 80-90° C.

After salting at least some of the carboxyl groups of the reaction mixture obtained after step b), the reaction mixture obtained may be devolatilized by briefly applying a vacuum.

After salting at least some of the carboxyl groups of the reaction mixture obtained after step b), the solids content of the reaction mixture obtained may further be adjusted by admixture of water.

The solids content of the reaction mixture obtained is preferably adjusted to 15-45 wt %, more preferably to 18-42 wt %, based on the total weight of the reaction mixture obtained after step c).

Step d)

The reaction mixture obtained after step c) is generally a dispersion which typically has an average particle size of 1 to 100 μm, preferably of 1 to 20 μm, for the dispersion.

The average particle size of the dispersion relates to the size of the dispersingly active particles formed from copolymers and oil.

It is only by shearing the reaction mixture obtained after step c) to an average particle size of 0.05 to 10 μm for the dispersion that the reaction mixture obtained after step c) is usable as a hydrophobicizing leather treatment composition.

A person skilled in the art will be aware of common procedures and also various equipment types for shearing.

The reaction mixture obtained after step c) is preferably exposed to high shearing forces in step d).

Possible usable apparatuses include dissolvers, rotor-stator systems, systems according to the impact comminution principle, ultrasound comminution via sonotrode and high-pressure homogenizers. The processes may be carried out batchwise or continuously.

The particle size distributions obtainable by the recited apparatuses are different, but are shiftable in the direction of smaller particle sizes by repeated or prolonged application.

It is further possible for the reaction mixture obtained after step c) to have oil added to it before shearing.

Regarding the oil, the preferred oils itemized under step a) apply mutatis mutandis.

The solids content of the reaction mixture obtained after step d) is preferably 15-45 wt %, more preferably 18-42 wt %, based on the total weight of the reaction mixture obtained after step d).

The solids content corresponds to the total dry amount of the reaction mixture obtained after step d) and hence, in the context of the present invention, to the total amount of the components used in steps a) to d) with the exception of water.

Step d) preferably comprises shearing the reaction mixture obtained after step c) to an average particle size of 0.1-8 μm for the dispersion.

The average particle size for the dispersion is measured via dynamic light scattering. The method is known to a person skilled in the art. In it, a sample of the dispersion has laser light transmitted through it. The diffraction, interference, refraction, absorption and reflection taking place in the process results in a scattered pattern which is characteristic of the particular particle size distribution. The particle size distribution is then computable therefrom by assuming a spherical shape for the particles. The average particle size for the dispersion is preferably measured according to ISO/CD 13320.

The molecular weight (Mw) of the copolymer present in the hydrophobicizing leather treatment composition is preferably in the range from 10 000 to 60 000 and more preferably in the range from 20 000 to 60 000.

Amounts of Components used in Steps a)-d):

The components used in steps a)-d) can be used in any desired amounts.

Preferred amounts of the components used in steps a)-d) for the preparation of the hydrophobicizing leather treatment composition in the manner of the invention, expressed relative to the total dry amount of the reaction mixture obtained after step d), are as follows:

at least one ethylenically unsaturated carboxylic acid or its derivatives of component i): 3.0 to 25.0 wt %, more preferably 5.0 to 20.0 wt %, most preferably 5.0 to 10.0 wt %, at least one (meth)acrylate of a primary saturated $C_8$ to $C_{22}$ alcohol of component ii):

8.0 to 20.0 wt %, more preferably 10.0 to 20.0 wt %, most preferably 10.0 to 15.0 wt %, at least one activator:

0.12 to 5 wt %, more preferably 0.35 to 2.0 wt %, most preferably 0.42 to 1.0 wt %, at least one chain transfer agent:

0.02 to 2.0 wt %, more preferably 0.05 to 1.2 wt %, most preferably 0.08 to 1.0 wt %, at least one base:

1.8 to 7.0 wt %, more preferably 2.1 to 6.0 wt %, most preferably 3.0 to 4.5 wt %, oil:

50.0 to 87.0 wt %, more preferably 60.0 to 82.5 wt %, most preferably 63.0 to 81.5 wt %, and miscellaneous added substances:

0.0 to 8.0 wt %, more preferably 0.0 to 5.0 wt %, most preferably 0.0 to 2.0 wt %.

As already mentioned under step d), total dry amount of the reaction mixture obtained after step d) is herein to be understood as meaning the total amount of the components used in steps a) to d) with the exception of water.

For the avoidance of doubt, the notional person skilled in the art selects the amounts of the components used in steps a)-d) for preparing the hydrophobicizing leather treatment composition such that they add up to 100 wt %, based on the total dry amount of the reaction mixture obtained after step d).

The weight ratio of the at least one ethylenically unsaturated carboxylic acid or its derivatives of component i) to the at least one (meth)acrylate of a primary saturated $C_8$ to $C_{22}$ alcohol of component ii) is generally 1:10-10:1, preferably 1:7-4:1, more preferably 1:4-2:1, most preferably 1:3-1:1.

The weight ratio of the water quantity to the total dry amount of the components used in steps a)-d) for preparing the hydrophobicizing leather treatment composition in the manner of the present invention is preferably 85:15 to 55:45, more preferably 82:18 to 58:42.

Miscellaneous Added Substances:

Further miscellaneous added substances may or may not be present in the method of the present invention.

The miscellaneous added substances preferably differ from components i), ii), the activator, the chain transfer agent, the base, the oil and the water.

The miscellaneous added substances are more preferably selected from the group consisting of organic solvents, emulsifiers, preservatives and also at least one further comonomer of component iii), said further comonomer being used in step a).

The preservative used is preferably a composition containing 2-methyl-2H-isothiazolin-3-one (MIT) and 1,2-benzisothiazolin-3-one (BIT).

Miscellaneous added substances are preferably present in the method of the present invention at from 0.0 to 8.0 wt %, more preferably at from 0.0 to 5.0 wt % and most preferably at from 0.0 to 2.0 wt %, based on the total dry quantity of the reaction mixture obtained after step d).

The method of preparing hydrophobicizing leather treatment compositions in the manner of the present invention preferably utilizes less than 2 wt %, more preferably less than 1 wt % and most preferably less than 0.5 wt % of an organic solvent, based on the total dry amount of the reaction mixture obtained after step d).

The term "organic solvent" is herein to be understood as meaning an organic substance which is liquid at 20° C. and in which either or both of the i) and ii) components used in step a) dissolves at 20° C. at not less than 0.1 mol/L, preferably at not less than 0.5 mol/L and more preferably at not less than 1 mol/L. As the component or components dissolve, there is preferably no chemical reaction between the solvent substance and the solute component(s).

The organic solvent is more preferably selected from the group consisting of alcohols, glycols, glycol ethers, glycol esters, diols and ketones, most preferably consisting of glycols, glycol ethers and glycol esters.

The term "organic solvent" herein does not comprehend organic components which react with the components used in steps a)-d) and therefore do not appear in the end product. The term "organic solvents" preferably does not comprehend the chain transfer agents optionally used in step a).

It is yet still particularly preferable for the method for preparing hydrophobicizing leather treatment compositions in the manner of the present invention to utilize essentially no organic solvents.

"Essentially no organic solvents" is herein to be understood as meaning a use of less than 0.1 wt % of an organic solvent in the method of the present invention, based on the total dry amount of the reaction mixture obtained after step d).

The method of preparing hydrophobicizing leather treatment compositions in the manner of the present invention preferably utilizes less than 2 wt %, more preferably less than 1 wt % and most preferably less than 0.5 wt % of an emulsifier, based on the total dry amount of the reaction mixture obtained after step d).

"Emulsifier" herein is to be understood as meaning any nonionic, cationic or anionic surface-active substances capable of stabilizing the reaction mixture obtained after step d).

It is still yet more preferable for the method for preparing hydrophobicizing leather treatment compositions in the manner of the present invention to utilize essentially no emulsifiers.

"Essentially no emulsifiers" is herein to be understood as meaning a use of less than 0.1 wt % of an emulsifier in the method of the present invention, based on the total dry amount of the reaction mixture obtained after step d).

The at least one further comonomer of component iii) is preferably selected from the group consisting of $C_1$-$C_7$ esters of ethylenically unsaturated carboxylic acids, more preferably selected from the group consisting of methyl acrylate, ethyl acrylate, propyl acrylate, butyl acrylate, methyl methacrylate, ethyl methacrylate, propyl methacrylate and butyl methacrylate, amides and nitriles of ethylenically unsaturated carboxylic acids, preferably acrylamide, methacrylamide, acrylonitrile and methacrylonitrile, and styrene, alpha-methylstyrene, isobutylene, diisobutylene, vinyl acetate and vinyl propionate.

The present invention further provides the hydrophobicizing leather treatment composition obtained by the method of the present invention.

Aqueous Dispersion

The invention further relates to an aqueous dispersion containing
- at least one copolymer obtainable by free-radically initiated copolymerization of at least one ethylenically unsaturated carboxylic acid or its derivatives of component i) with at least one (meth)acrylate of a primary saturated $C_8$ to $C_{22}$ alcohol, of component ii), and
- at least one oil, wherein the average particle size of the dispersion is 0.05-10 µm, preferably 0.1-8 µm.

The average particle size of the dispersion relates to the size of the dispersingly acting particles formed from copolymers and oil. The remarks appearing under step d) hold analogously for the shearing and also the measurement of the average particle size of the dispersion.

The aqueous dispersion may further contain at least one activator, at least one base, and/or miscellaneous added substances. All the above descriptions and preferred ranges for components i), ii), the at least one oil, the at least one activator, the at least one base and the miscellaneous added substances apply analogously.

The aqueous dispersion contains with preference 40-80 wt %, with particular preference 50-70 wt % of water, based on the total amount of the aqueous dispersion.

The aqueous dispersion contains with preference 15-55 wt % and with particular preference 25-45 wt % of the total dry amount of the at least one copolymer and of the at least one oil, based on the total amount of the aqueous dispersion.

The aqueous dispersion may further contain 0-5 wt % of further ingredients, preferably selected from the group consisting of at least one activator, at least one base and also the miscellaneous added substances defined above.

A particularly preferred miscellaneous added substance is a preservative, most preferably a composition containing 2-methyl-2H-isothiazolin-3-one (MIT) and 1,2-benzisothiazolin-3-one (BIT).

Particular preference is given to an aqueous dispersion containing
- 5-10 wt % of at least one copolymer obtainable by copolymerization of acrylic acid with stearyl methacrylate,
- 20-30 wt % of white oil,
- 0.1-0.5 wt % of a preservative, and
- 60-70 wt % of water, wherein the average particle size of the dispersion is 0.05-10 µm, preferably 0.1-8 µm, and wherein the wt % ages are based on the total amount of the aqueous dispersion.

Methods of Tanning Leather

The hydrophobicizing leather treatment composition obtained by the method of the present invention and also the aqueous dispersion of the present invention are useful in methods of tanning leather.

The present invention further provides methods of tanning leather using the hydrophobicizing leather treatment composition obtained by the method of the present invention or the aqueous dispersion of the present invention.

The hydrophobicizing leather treatment compositions obtained by the method of the present invention are usable with preference in methods of tanning leather without further reactions taking place after step d), for example methods of removing organic solvents such as distillations.

The method of tanning leather preferably utilizes dewatered, especially salted animal hides as raw material.

These are typically first readied for the actual tanning operation in a manner known to a person skilled in the art by a series of treatment steps in the beamhouse.

Beamhouse:
- I. Soak in water by use of softening auxiliaries or washing agents.
- II. Fleshing, optionally splitting the rawhides.
- III. Washing in water in the presence of washing agents, optionally also brighteners.
- IV. Optionally pickling to open up the hide with water, sodium chloride and acids, usually by using additional auxiliaries such as bleaching agents and/or washing agents.

Tanning:
- V. Tanning with inorganic and/or organic, natural and/or synthetic tanning agents such as, for example, chromium salts or syntans, resin type tanning agents, polymeric tanning agents or vegetable type tanning agents.

The inorganic tanning agents used are essentially chromium(III) salts, but also aluminium, zirconium and iron salts.

Synthetic tanning agents used include for example: condensation products of sulfonated aromatics with aldehydes and/or ketones and optionally yet further with urea and/or its derivatives and optionally unsulfonated aromatics. Sulfonated aromatics include for example: naphthalenesulfonic acid, phenolsulfonic acid, sulfonation products of ditolyl ether, of biphenyl, of terphenyl, and also 4,4'-dihydroxydiphenylsulfone and benzene- and also toluenesulfonic acid. By aldehydes and/or ketones are meant aliphatic, cycloaliphatic and aromatic types, preference being given to aliphatic ones, while particular preference is given to formaldehyde and also its low molecular weight analogues. The unsulfonated aromatics are phenol, ditolyl ether, dihydroxytolyl ether, dihydroxyditolyl sulfone and also hydroxybenzoic acid. Useful urea derivatives include melamine, dimethylolurea and guanidine.

Further synthetic tanning agents are for example condensation products of ditolyl ether sulfonic acid and 4,4'-dihydroxydiphenyl sulfone, and also condensation products of sulfonated naphthalene and sulfonated phenol or 4,4'-dihydroxydiphenyl sulfone with formaldehyde or cocondensates of sulfonated ditolyl ether, sulfonated phenol, urea and phenol with formaldehyde.

Resin type tanning agents are preferably polycondensation products of melamine, dicyandiamide, urea, ligninsulfonate with formaldehyde or glutaraldehyde.

Vegetable type tanning agents are plant derived and include, for example, chestnut extract, mimosa, tara and quebracho. Other vegetable type tanning agents are obtained from plants or plant parts such as fruits, for example olives, or rhubarb, or leaves, rinds, roots, woods by extraction or by chemical and/or enzymatic modifying processes.

Retanning:
- VI. Further processing with organic retanning agents, fatliquoring agents, optionally also dyeing and also hydrophobicization.

VII. Drying and also finalization of the leather: draining, suspension drying, conditioning, staking and optionally buffing the surface.

In the retanning operation, in method step VI., is typically also where the hydrophobicization with the hydrophobicizing leather treatment composition obtained by the method of the present invention or with the aqueous dispersion of the present invention is carried out.

A further possibility consists in the use of wet blue (leather after chrome tanning) as the starting point for the process described above.

A detailed description of the requisite operating steps is found in the examples.

Particularly desirable properties for the treated leather are the uniformity of the treated leathers in respect of fullness, softness, firmness and elasticity, the colouration without spots and also the absence of an unpleasant hand, of loose grain and other undesirable properties. Nor should there preferably be adverse impacts on the dye- and dressability of the leather obtained or on the appearance of the leather.

Retanning as such is often carried out concurrently with dyeing and fatliquoring in one step.

Treatment with the hydrophobicizing leather treatment composition obtained according to the method of the present invention allows retanning and optionally fatliquoring and dyeing to be carried out in one drum and in one operation.

The hydrophobicizing leather treatment composition obtained by the method of the present invention or the aqueous dispersion of the present invention are used in the method of tanning the leather at between 2 and 15 wt %, preferably 3 to 10 wt %, based on the shaved weight.

The method of tanning leather may also use with preference hydrophobicizers based on polysiloxanes in addition to the hydrophobicizing leather treatment composition obtained by the method of the present invention or the aqueous dispersion of the present invention.

Suitable hydrophobicizers based on polysiloxanes are known per se. Preferred hydrophobicizers based on polysiloxanes are carboxyl-containing polysiloxanes which are convertible into aqueous dispersions by means of alkali.

Particular preference is given to the polysiloxanes of WO 2011/147959, which contain 1,3-dihydroxyalkyl structural units and are processible into aqueous compositions.

The amounts in which the hydrophobicizers based on polysiloxanes are used in the method of tanning the leather are between 2 and 15 wt %, preferably 3 to 10 wt % and more preferably 3 to 6 wt %, based on the shaved weight.

The hydrophobicizers based on polysiloxanes are preferably used in the form of aqueous emulsions or dispersions, more preferably as micro- or macroemulsions.

The polysiloxanes and the hydrophobicizing leather treatment composition obtained after step d) are usable in the same float, at the same time or in succession. This has the advantage that the quantitative ratio of the two hydrophobicizing components relative to each other is adjustable to meet a very wide variety of hydrophobicization requirements.

This is an immense advantage because, in contradistinction to the freely choosable mixing ratio described above, only a single fixed mixing ratio is realizable with one-component hydrophobicizing leather treatment compositions.

The invention further provides leathers obtained by methods of tanning leather which each employ the hydrophobicizing leather treatment composition obtained by the method of the present invention or the aqueous dispersion of the present invention.

The leathers obtained preferably have a MAESER value of greater than 15 000, more preferably greater than 30 000 and most preferably greater than 50 000, and/or a static water absorption of less than 35%, more preferably less than 30%, as measured to ASTM D-2099-70.

EXAMPLES

I) Method of Preparing Hydrophobicizing Leather Treatment Compositions in the Manner of the Present Invention Example 1

130 g of White oil 285 (from Parafluid) are initially charged at 140° C. under nitrogen. The monomers are prepared as a mixture of 130 g of Stearyl methacrylate 1618 F (from BASF SE), 70 g of 98% pure acrylic acid (from Acros) and 1.2 g of oleic acid (from Aldrich), while a solution of 6 g of ditertiary butyl peroxide (from Merck) in 20 g of White oil 285 (from Parafluid) serves as initiator solution.

To consistently start the reaction, 10 g of the monomer mixture are added to the initial charge of white oil and, after homogenization, the remainder of the abovementioned monomer mixture is then added over 2 hours under agitation at the same time as the abovementioned initiator solution. Further stirring at 140° C. for 2 hours follows the admixture.

After two hours, the batch is allowed to cool down to 100° C. and admixed with 1440.7 g of demineralized water. After the admixture of water, 77.8 g of 50% aqueous sodium hydroxide solution diluted with 100 g of demineralized water are added.

After one hour of stirring at 80 to 90° C., a vacuum is applied for devolatilization and 600 g of water are admixed to adjust the solids content to 20%.

200 g of the dispersion obtained are admixed with 50 g of White oil 285 (from Parafluid) and treated with a T 25 B Ultra-Turrax from IKA at 300 rpm for 10 min. The average particle size of the dispersion is measured as 1.397 μm by dynamic light scattering (using an LS 230 from Beckman Coulter).

Example 2

130 g of White oil 285 (from Parafluid) are initially charged at 140° C. under nitrogen. The monomers are prepared as a mixture of 130 g of Stearyl methacrylate 1618 F (from BASF SE), 70 g of 98% pure acrylic acid (from Acros) and 1.2 g of oleic acid (from Aldrich), while a solution of 6 g of ditertiary butyl peroxide (from Merck) in 20 g of White oil 285 (from Parafluid) serves as initiator solution.

To consistently start the reaction, 10 g of the monomer solution are added to the initial charge of white oil and, after homogenization, the remainder of the abovementioned monomer mixture is then added over 2 hours under agitation at the same time as the abovementioned initiator solution.

Further stirring for 2 hours follows the admixture. After the first hour, 546 g of White oil 285 (from Parafluid) are admixed.

The two hours are followed by cooling down to 100° C. and admixing 1274.3 g of demineralized water, preheated to 80 to 90° C., until homogeneous. After water admixture, 77.8 g of 50% aqueous sodium hydroxide solution diluted with 100 g of demineralized water are added.

One hour of stirring at 80 to 90° C. is followed by application of vacuum for devolatilization and adjustment of the solids content to 40%.

For shearing, the dispersion obtained is aftertreated with a T 25 B Ultra-Turrax from IKA at the highest setting for 10 minutes.

The average particle size of the dispersion is measured as 1.687 μm (measurement method and instrument correspond to Example 1).

Example 3

263.6 g of White oil 285 (from Parafluid) are initially charged at 140° C. under nitrogen.

The monomers are prepared as a mixture of 47.2 g of Stearyl methacrylate 1618 F (from BASF SE), 25.5 g of 98% pure acrylic acid (from Acros) and 3.5 g of 1-butanol (from Alfa-Aesar), while a solution of 2.1 g of ditertiary butyl peroxide (from Merck) in 20 g of White oil 285 (from Parafluid) serves as initiator solution.

To consistently start the reaction, 9.8 g of the monomer mixture are added to the initial charge of white oil and, after homogenization, the remainder of the abovementioned monomer mixture is then added over 2 hours under agitation at the same time as the abovementioned initiator solution. Further stirring at the same temperature for 2 hours follows the admixture.

The two hours are followed by cooling down to 100° C. and admixing 560.0 g of demineralized water, preheated to 80 to 90° C., until homogeneous. After water admixture, 28.2 g of 50% aqueous sodium hydroxide solution diluted with 100 g of demineralized water are added.

After one hour of stirring at 80 to 90° C., a vacuum is applied for devolatilization and 44.3 g of water are admixed to adjust the solids content to 36%.

The dispersion thinned to a 20% solids content for viscosity reasons is treated twice with a Micro Fluidizer from Micro Fluidics at 1100 bar. The average particle size of the dispersion is measured as 0.133 μm (measurement method and instrument correspond to Example 1).

Example 4

130 g of White oil 285 (from Parafluid) are initially charged at 140° C. under nitrogen.

The monomers are prepared as a mixture of 130 g of Stearyl methacrylate 1618 F (from BASF SE), 70 g of 98% pure acrylic acid (from Acros) and 1.2 g of oleic acid (from Aldrich), while a solution of 6 g of ditertiary butyl peroxide (from Merck) in 20 g of White oil 285 (from Parafluid) serves as initiator solution.

To consistently start the reaction, 10 g of the monomer solution are added to the initial charge of white oil and, after homogenization, the remainder of the abovementioned monomer mixture is then added over 2 hours under agitation at the same time as the abovementioned initiator solution.

Further stirring for two hours follows the admixture. After the first hour, 546 g of White oil 285 (from Parafluid) are admixed.

After two hours, the batch is allowed to cool down to 90° C. and the clear solution is drawn off.

A glass beaker is initially charged with 230.4 g of water followed by the admixture of 13.2 g of 50% aqueous sodium hydroxide solution. This mixture is stirred with a 70 mm diameter dissolver disc at low speeds. This is followed by the addition in the form of a thin jet of 150.8 g of the polymer prepared as described in Example 5 and dissolved in white oil, and the speed is carefully raised to 3000 rpm.

The dispersion thus obtained (with a solids content of 39.9%) is then aftertreated with a Gaulin 15M 8TA high-pressure homogenizer at 200 bar twice and thereafter once more at 500 bar.

The average particle size of the dispersion is measured as 5.448 μm (measurement method and instrument correspond to Example 1).

Example 5

130 g of White oil 285 (from Parafluid) are initially charged at 140° C. under nitrogen.

The monomers are prepared as a mixture of 130 g of Stearyl methacrylate 1618 F (from BASF SE), 70 g of 98% pure acrylic acid (from Acros) and 1.2 g of oleic acid (from Aldrich), while a solution of 6 g of ditertiary butyl peroxide (from Merck) in 20 g of White oil 285 (from Parafluid) serves as initiator solution.

To consistently start the reaction, 10 g of the monomer solution are added to the initial charge of white oil and, after homogenization, the remainder of the abovementioned monomer mixture is then added over 2 hours under agitation at the same time as the abovementioned initiator solution.

Further stirring for two hours follows the admixture. After the first hour, 546 g of White oil 285 (from Parafluid) are admixed.

After two hours, the batch is allowed to cool down to 90° C. Thereafter, 2059.3 g of demineralized water are admixed under agitation, followed by stirring until homogeneous. Then, 77.8 g of 50% aqueous sodium hydroxide solution dissolved in 100 g of water are run in and the reaction mixture is additionally stirred at 80 to 90° C. for one hour and then briefly devolatilized in vacuo.

The 30% dispersion present is treated with a 70 mm diameter dissolver disc at 4000 revolutions/min for 5 minutes. The average particle size of the dispersion is measured as 3.102 μm (measurement method and instrument correspond to Example 1).

Example 6

180 g of White oil 285 (from Parafluid) are initially charged in a stirred three-neck flask at 140° C. under nitrogen.

The monomers are prepared as a mixture of 70 g of Stearyl methacrylate 1618 F (from BASF SE), 130 g of 98% pure acrylic acid (from Acros) and 3.6 g of oleic acid (from Aldrich), while a solution of 6 g of ditertiary butyl peroxide (from Merck) in 20 g of White oil 285 (from Parafluid) serves as initiator solution.

To consistently start the reaction, 10 g of the monomer solution are added to the initial charge of white oil and, after homogenization, the remainder of the abovementioned monomer mixture is then added over 2 hours at the same time as the abovementioned initiator solution.

Following a pronounced increase in viscosity, a further 250 g of white oil are added. This is followed by a further two hours of stirring at 140° C.

After two hours, the batch is allowed to cool down to 90° C. Thereafter, 436.6 g of demineralized water are admixed under agitation, followed by stirring until homogeneous. Then, 60 g of 50% aqueous sodium hydroxide solution are run in and the reaction mixture is additionally stirred at 80 to 90° C. for one hour. During that time, altogether 1300 ml of demineralized water are admixed to reduce the viscosity. This is followed by brief devolatilization in vacuo.

The 26% dispersion present is treated with a 70 mm diameter dissolver disc at 4000 revolutions/min for 5 minutes. The average particle size of the dispersion is measured as 2.756 μm (measurement method and instrument correspond to Example 1).

II) Performance Examples

Tanning of Leather by Using the Hydrophobicizing Leather Treatment Compositions Obtained According to Examples 1-6

The starting material is chrome-tanned cattlehide wet blue containing about 2.5% of chromium(III) oxide and having a shaved thickness of 1.5 to 2.0 mm; the treatment takes place in customary rotating drums.

The following operating steps are carried out in sequence (the particulars in % are based on the shaved weight of the wet blue):

A. Acidic wash with 200% of water and 0.2% of 85% formic acid. (Time required: 15 min):
Target pH of liquor at the end: 3.3.
Drop the float.
B. Retanning, first stage (time required in total: 240 min)
Admixture of 100% of water and
2% of a lightfast chromium- and syntan-containing retanning agent (Blancorol RC, LANXESS)
2% of chromium(III) sulfate, (Chromosal B, LANXESS),
1.5% of a lightfast anionic retanning agent (Tanigan PAK, LANXESS),
1.0% of sodium formate,
1.0% of sodium bicarbonate,
3.0% of a synthetic polycondensation replacement tanning agent (Tanigan F, LANXESS),
Target pH of the liquor at the end: 5.0.
Drop the float.
C. Retanning, dyeing (time required in total: 240 min):
Admixture of 50% of water and
4.0% of an acrylate copolymer-based retanning agent (Leukotan 8090 LANXESS),
4.0% of chestnut extract, sweetened,
4.0% of a synthetic polycondensation replacement tanning agent (Tanigan F, LANXESS),
4.0% of an anionic resin type tanning agent (Retingan R 7, LANXESS),
1.0% of a synthetic polycondensation tanning agent (Tanigan PR, LANXESS),
3.0% of a dye (Baygenal Yellow Brown 3G, LANXESS),
5.0% of a hydrophobicizing leather treatment composition as per any one of Examples 1-6

4.0% of a hydrophobicizer based on polysiloxane (Levotan W, LANXESS)
D. Sharpening (time required in total: 60 min):
Admixture of 100% of water and
1.1% of 85% formic acid and also after 30 minutes
1.1% of 85% formic acid.
Target pH of the liquor at the end: 3.4 to 3.6.
Drop the float.
E. Rinsing (time required in total: 10 min):
Admixture of 300% of water.
Drop the float.
F. Fixing (time required in total: 90 min):
Admixture of 300% of water and
2% of modified chromium(III) sulfate (Chromosal BF, LANXESS) and after 30 minutes again
2% of modified chromium(III) sulfate.
Target pH of the liquor at the end: 3.3.
After 60 min drop the float.
G. Rinsing (time required in total: 10 min):
Admixture of 300% of water.
Drop the float.
H. Rinsing (time required in total: 10 min):
Admixture of 300% of water.
Drop the float.
I. Rinsing (time required in total: 10 min):
Admixture of 300% of water.
Drop the float.
J. Finalizing:
After draining, leathers horsed overnight, then set out, suspension dried, staked.

The leathers obtained are soft, firm-grained, exhibited a smooth grain side and have a pleasant hand. No depth of shade difference is detectable between the grain side and the flesh side.

To determine their hydrophobic properties, especially their dynamic water resistance, the leathers were MAESER tested (in line with ASTM D 2099-70). In this test, the waterproofness of the leather treated with the hydrophobicizing leather treatment composition is tested under permanent flexing of the diecut leather test specimen. This simulates the stress imposed on a leather made into a shoe or boot donned for a walk in a wet environment (high wet grass, puddles, mud).

A MAESER value of >greater than 15 000 is the minimum criterion of the U.S. military for waterproof shoe leather. The static water absorption of up to 30% is deemed acceptable for the industrial standard.

To this end, 4 test specimens were diecut out of each leather, two in the longitudinal direction and two crosswise thereto. In addition, the static water absorption was determined.

TABLE 1

| Example | Average particle size μm | MAESER value average | MAESER values individual | Water absorption static [%] |
|---|---|---|---|---|
| 1 | 1.397 | >50000 | 4 × >50000 | 26.6 |
| 2 | 1.687 | 42175 | 39000, 29700, 2 × 50000 | 32.8 |
| 3 | 0.133 | >50000 | 4 × >50000 | 24.7 |
| 4 | 5.448 | 32900 | 12800, 22300, 46500, >50000 | 32.1 |
| 5 | 3.102 | 39750 | 1 × 9000, 3 × >50000 | 23.8 |
| 6 | 2.756 | 14495 | 11500, 17400, 13550, 15530 | 42.7 |

What is claimed is:

1. A method of preparing hydrophobicizing leather treatment compositions comprising the steps of
   a) free-radically initiated copolymerization of
      i) at least one ethylenically unsaturated carboxylic acid or its derivatives, and
      ii) at least one (meth)acrylate of a primary saturated $C_8$ to C22 alcohol,
   b) mixing the reaction mixture obtained after step a) with water,
   c) salting carboxyl groups of the reaction mixture obtained after step b) with a base, and
   d) shearing the reaction mixture obtained after step c) to an average particle size of 0.05-10 µm,
   wherein step a) is carried out in white oil as reaction medium and wherein the atmosphere in step a) comprises less than 0.1% by volume of an oxidizing gas.

2. The method according to claim 1, wherein the at least one ethylenically unsaturated carboxylic acid or its derivatives of component i) is selected from the group consisting of acrylic acid, methacrylic acid, itaconic acid, fumaric acid and maleic acid and also their derivatives, and alkali metal salts, and their mixtures.

3. The method according to claim 1, wherein the at least one (meth)acrylate of a primary saturated $C_8$ to C22 alcohol of component ii) is selected from the group consisting of octyl acrylate, octyl methacrylate, 2-ethylhexyl acrylate, 2-ethylhexyl methacrylate, methacrylic ester of hydrogenated tallow fat alcohol, acrylic ester of hydrogenated tallow fat alcohol, stearyl methacrylate, stearyl acrylate, hexadecyl acrylate, hexadecyl methacrylate, dodecyl acrylate, dodecyl methacrylate, eicosanyl acrylate, eicosanyl methacrylate, docosanyl methacrylate and docosanyl acrylate and their mixtures.

4. The method according to claim 1, wherein the copolymerization is initiated by at least one activator selected from the group consisting of tertiary butyl hydroperoxide, ditertiary butyl peroxide, dibenzoyl peroxide, succinic peroxide, cumene hydroperoxide, tertiary butyl perbenzoate, 2,2-azobis(2-methylbutyronitrile), 2,2-azobisisobutyronitrile and mixtures thereof.

5. The method according to claim 1, wherein step a) utilizes at least one chain transfer agent.

6. The method according to claim 1, wherein the weight ratio of the at least one ethylenically unsaturated carboxylic acid or its derivatives of component i) to the at least one (meth)acrylate of a primary saturated C8 to C22 alcohol of component ii) is 1:10-10:1.

7. The method according to claim 1, wherein the shearing in step d) is to an average particle size of 0.1-8 µm.

8. The method according to claim 1, wherein further added substances present in the process are selected from the group consisting of organic solvents, emulsifiers, preservatives and also at least one further comonomer of component iii), said further comonomer being used in step a).

9. The method according to claim 1, wherein the amounts of the components used in steps a)-d) of the method, expressed relative to the total dry amount of the reaction mixture obtained after step d), are as follows:
   at least one ethylenically unsaturated carboxylic acids or its derivatives of component i): 3.0 to 25.0 wt %,
   at least one (meth)acrylate of a primary saturated C8 to C22 alcohol of component ii): 8.0 to 20.0 wt %,
   at least one activator: 0.12 to 5 wt %,
   at least one chain transfer agent: 0.02 to 2.0 wt %,
   at least one base: 1.8 to 7.0 wt %,
   white oil: 50.0 to 87.0 wt %, and
   further added substances: 0.0 to 8.0 wt %.

10. The method according to claim 1, wherein the method utilizes less than 2 wt % of an organic solvent, relative to the total dry amount of the reaction mixture obtained after step d).

11. The method according to claim 1, wherein the method utilizes less than 2 wt % of an emulsifier, relative to the total dry amount of the reaction mixture obtained after step d).

12. The method according to claim 1, wherein the at least one (meth)acrylate of a primary saturated C8 to C22 alcohol of component ii) is selected from the group consisting hexadecyl acrylate, stearyl methacrylate and their mixtures.

13. The method according to claim 1, wherein the copolymerization is initiated by at least one activator selected from the group consisting of ditertiary butyl peroxide, 2,2-azobis(2-methylbutyronitrile) and mixtures thereof.

* * * * *